United States Patent

Nakata et al.

Patent Number: 5,162,441
Date of Patent: Nov. 10, 1992

[54] SEALING PART FOR HYDRAULIC CYLINDER

[75] Inventors: Rikizou Nakata, Aichi; Hidenori Hayashi, Gifu; Kiyomitsu Terashima; Hidenobu Honda, both of Nagoya, all of Japan

[73] Assignee: Toyoda Gosei Co., Ltd., Nishikasugai, Japan

[21] Appl. No.: 640,798

[22] Filed: Jan. 16, 1991

[30] Foreign Application Priority Data

Jan. 16, 1990 [JP] Japan .................................. 2-006876

[51] Int. Cl.$^5$ ....................... C08L 23/16; C08L 23/26
[52] U.S. Cl. ..................... 525/194; 525/193; 525/240; 525/211; 525/237
[58] Field of Search ................ 525/211, 237, 240, 194

[56] References Cited

U.S. PATENT DOCUMENTS

| | | | |
|---|---|---|---|
| 3,468,979 | 9/1969 | Hamed et al. | 525/211 |
| 3,817,952 | 6/1974 | Knabeschuh et al. | |
| 3,862,106 | 1/1975 | Fischer. | |
| 3,884,993 | 5/1975 | Gros | 525/211 |
| 4,078,131 | 3/1978 | Zarauz | 525/237 |
| 4,259,468 | 3/1981 | Kajiura et al. | |
| 4,268,637 | 5/1981 | Weldy. | |
| 4,431,775 | 2/1984 | Maeda et al. | |
| 4,722,971 | 2/1988 | Datta et al. | 525/211 |
| 4,786,697 | 11/1988 | Cozewith et al. | 526/88 |
| 4,789,714 | 12/1988 | Cozewith et al. | 526/88 |
| 4,874,820 | 10/1989 | Cozewith et al. | 525/240 |
| 4,960,829 | 10/1990 | Allen et al. | 525/211 |

FOREIGN PATENT DOCUMENTS

| | | |
|---|---|---|
| 0230753 | 8/1987 | European Pat. Off. . |
| 0246745 | 11/1987 | European Pat. Off. . |
| 0302400 | 2/1989 | European Pat. Off. . |
| 0313045 | 4/1989 | European Pat. Off. . |
| 0072948 | 4/1985 | Japan . |
| 1181849 | 8/1986 | Japan . |
| 61-221249 | 10/1986 | Japan . |

*Primary Examiner*—Carman J. Seccuro, Jr.
*Attorney, Agent, or Firm*—Cushman, Darby & Cushman

[57] ABSTRACT

A sealing part formed a peroxide vulcanizate of a rubber compound having as a polymer component an EPDM mixture of 50 to 90 parts by weight of an EPDM having a Mooney viscosity ($ML_{1+4}$ 100° C.) of 35 to 55, and 50 to 10 parts by weight of a low-Mooney EPDM (a sub-polymer) having a Mooney viscosity ($ML_{1+4}$ 100° C.) of 5 to 25. The sealing part of the present invention has a high resistance to low-temperature compression permanent strain and is excellent in the kneadability of a rubber compound for producing the sealing part.

7 Claims, 1 Drawing Sheet

SEALING PART FOR HYDRAULIC CYLINDER

BACKGROUND OF THE INVENTION
1. Field of the Invention

The present invention relates to vulcanizable EPDM rubber blends, and, in particular to peroxide vulcanizates of a rubber blend comprising a mixture of high Mooney viscosity and low Mooney viscosity EPDM rubbers and articles of manufacture, such as mechanical seals for hydraulic systems formed therefrom.

2. Background Information

The tendency of polymeric materials used in the sealing parts for hydraulic cylinders, to wear is well known. This creates a variety of problems including a loss of mechanical properties such as low resistance to abrasion, erosion, and sealing capability. Consequently, it has been proposed to improve the mechanical properties of the sealing parts by using other polymeric materials, such as styrene-butadiene rubber (SBR). Although the use of styrene-butadiene rubber has been proposed for use in sealing parts, this use is subject to a variety of constraints. For example, such components cannot be used at higher temperatures or with high boiling substances (such as boric ester-added ethylene glycol and silicon oil) for brake fluids. As a consequence, manufacturers have now switched from traditional styrene-butadiene rubber components to rubber components comprising ethylene propylene diene monomer (EPDM).

Recently, due to the installment of electronic lock-proofing mechanisms (e.g. the "ESC system") to guard against impact when braking, a need has arisen for sealing parts having great strength (particularly high resistance to erosion and to abrasion) and satisfactory sealing properties. Such sealing parts, however, do not retain these mechanical properties over long periods of time.

It has been proposed to improve sealing parts for a hydraulic cylinder comprising a composition formed of a peroxide vulcanizate of a rubber compound comprising as a polymer component an ethylene propylene diene monomer. The polymer component satisfies the following requirements: (a) an ethylene content of 60 to 70 wt%, an α-olefin content of 40 to 30 wt%, a Mooney viscosity of ($ML_{1+4}$ 100° C.; hereinafter referred to as "ML") 35 to 55, and an iodine value of 20 to 35; (b) a molecular weight distribution where $M_w/M_n \leq 5.0$; and (c) an α-olefin content in the polymer component which is 20 wt%, each on the opposite sides of the o-olefin composition distribution where $C_3E - C_3I \leq 5.0$ wt%, where $C_3I$ stands for the high molecular weight side α-olefin component and $C_3E$ for the low molecular weight side α-olefin component (see Japanese Patent Application Laid-open SHO 61(1986)-221249).

The rubber compound comprising ethylene propylene diene monomer as the polymer component, however, exhibits poor kneading processability. That is, dispersal of additional (supplementary) materials in the rubber compound during the primary kneading step with a Banbury mixer or the like prior to roll milling is not satisfactory, and the composition obtained by the primary kneading does not exhibit roll retention during secondary kneading, i.e., the roll milling.

Furthermore, the peroxide vulcanizate does not possess sufficient resistance to low-temperature compression permanent strain in some cases when excellent physical properties are required.

Applicants have now devised a sealing part for a hydraulic cylinder which eliminates or substantially overcomes the aforementioned problems. This sealing part exhibits an improved resistance to low-temperature permanent compression strain and permits improvement in the kneading processability of a rubber compound used for producing the sealing part.

SUMMARY OF THE INVENTION

Broadly, the present invention comprises a readily processable vulcanizable rubber blend of at least 50 wt parts of a high Mooney viscosity EPDM rubber and up to 50 wt parts of a low Mooney viscosity EPDM rubber.

More specifically, the present invention comprises a peroxide vulcanizate of an EPDM rubber blend containing at least 50 wt parts of an EPDM rubber having a Mooney viscosity of 35 to 55 and up to 50 wt parts of an EPDM rubber having a Mooney viscosity of 5 to 25 which can be formed into seals (or sealing parts) useful in hydraulic systems subject to wide variations in conditions.

Accordingly, the present invention provides a sealing part formed of a peroxide vulcanizate of a rubber mixture comprising 50 to 90 parts by weight of an EPDM having an ethylene content of 45 to 59 wt%, an α-olefin content of 41 to 55 wt%, a Mooney viscosity ($ML_{1+4}$ 100° C.) of 35 to 55, and an iodine value of 20 to 35, and 50 to 10 parts by weight of a low-Mooney EPDM (a sub-polymer) having a Mooney viscosity ($ML_{1+4}$ 100° C.) of 5 to 25.

Further, according to the invention, the high Mooney viscosity EPDM has a molecular weight distribution of $M_w/M_m \leq 5.0$.

Still further according to the invention, the high Mooney viscosity EPDM rubber has an α-olefin composition distribution of $C_3E - C_3I \leq 5.0$ wt%, wherein $C_3I$ stands for the high molecular weight side α-olefin content and $C_3E$ for the low molecular weight α-olefin content respectively in the polymers of the portions, 20 wt%, each in the opposite sides of the molecular weight distribution.

DETAILED DESCRIPTION OF THE PRESENTLY PREFERRED EXEMPLARY EMBODIMENTS

Figure 1:
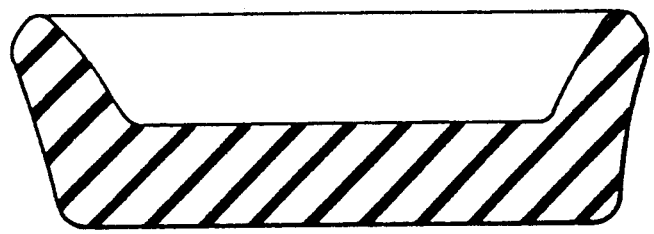
FIG. 1 shows a plate type piston cup for a hydraulic cylinder.

As noted above, the invention relates to vulcanizable EPDM rubber blends, and, in particular to peroxide vulcanizates of a rubber blend comprising a mixture of high Mooney viscosity and low Mooney viscosity EPDM rubbers and articles of manufacture, such as mechanical seals or sealing parts for any system requiring properties of improved resistance to low-temperature permanent compression strain and permits improvement in the kneading processability.

The blending proportions are all by weight unless otherwise specified.

(1) The main polymer ethylene propylene diene monomer (hereinafter referred to as "the main EPDM") is obtained by adding ethylene, an α-olefin and at least one diene to an inert solvent in the presence of a suitable catalyst and polymerizing under atmospheric pressure or slightly increased pressure. This resulting polymer has an ethylene content of 45 to 59 wt%, an α-olefin content of 41 to 55 wt%, a diene (third component) content of not more than 5 wt%, a Mooney viscosity (ML) of 35 to 55 and an iodine value of 20 to 35.

Generally, propylene is used as the α-olefin. Optionally, 1-butene or other similar α-olefin may be used instead. As the diene, a non-conjugated diene or a mixture of non-conjugated dienes selected from the group consisting of ethylidenenorbornene, propenyl norbornene, vinyl norbornene, dicyclopentadiene, 1,4-hexadiene, 2-methyl-1,5-hexadiene, 1,6-octadiene, 1,5-octadiene, 1,7-octadiene, 1,4-octadiene, and methyl hydroindene is used. The diene may also be used in combination with conjugated dienes such as butadiene, isoprene, etc.

When the ethylene content in the composition is less than 45%, the mechanical properties of the vulcanizate will deteriorate. When it exceeds 59 wt%, the low-temperature resistance is lowered.

(2) In the main EPDM, the molecular weight distribution is so sharp as to be defined by the equation $M_w/M_n \leq 5.0$ and the α-olefin composition distribution is so sharp as to be defined by the equation $C_3E - C_3I \leq 5.0$ wt%, where $C_3I$ stands for the high molecular weight side α-olefin content and $C_3E$ for the low molecular weight side α-olefin content respectively in the polymer component of 20 wt%, each in the opposite sides of the molecular weight distribution. In the EDPM polymer used in conventional sealing parts, the molecular weight distribution satisfies the following equation $M_w/M_n = 8-20$ and the α-olefin composition distribution satisfies the equation $C_3E - C_3 = 8-15$ (wt%). If the requirements mentioned above are not met, the improvement particularly in the resistance to erosion and to enervation cannot be obtained.

(3) The low-Mooney EPDM (referred to as "the sub-EPDM") is blended as a sub-polymer with the main EPDM.

The low-Mooney EPDM, i.e., the sub-EPDM, is an EPDM having a Mooney viscosity (ML) of 5 to 25 (preferably 5 to 15) which is much lower than that of conventional EPDM's (30 or more). The ethylene content of the sub-EPDM is preferably close to that of the main EPDM from the viewpoint of compatibility between these EPDM's.

The proportions of the main EPDM and the sub-EPDM are 50 to 90 parts and 50 to 10 parts, respectively. When the proportion of the sub-EPDM is less than 10 parts, the effects of the addition of the sub-EPDM (mainly an improving effect on the kneading processability) cannot be obtained. When it exceeds 50 parts, the sub-EPDM has an undesirable influence on the strength properties of the vulcanizate.

(4) The polymer component obtained by blending the sub-EPDM having a low Mooney viscosity with the main EPDM are properly incorporated with compounding ingredients such as carbon black, zinc oxide, processing aid, antioxidant, and coloring material which are generally used in the peroxide vulcanizate of EPDM. An organic peroxide is also added to the polymer component together with a co-crosslinking agent. By compression, transfer or injection molding and vulcanizing the rubber compound thus obtained, the sealing part for the hydraulic cylinder aimed at by this invention is produced.

As processing aids, conventional higher fatty acids and the like can be used. As the antioxidant, conventional amine type antioxidants and the like can be used.

Specific examples of the organic peroxide are benzoyl peroxide, 2,4-dichlorobenzoyl peroxide, n-butyl-4,4-bis(t-butylperoxy)-valerate, dicumyl peroxide, di-t-butylperoxydiisopropylbenzene, 2,5-dimethyl-2,5-(t-butylperoxy)hexane, and 2,5-dimethyl-di(t-butylperoxy)-hexine-3. Specific examples of the co-crosslinking agent are sulfur, trimethacrylate, trimethylol propane, triallyl isocyanurate, and phenothiazine.

As described above, the sealing part for a brake cylinder according to the present invention is a sealing part for a hydraulic cylinder, formed of a peroxide vulcanizate comprising an EPDM mixture as a polymer component, wherein the polymer component is a blend of the main EPDM and the sub-EPDM having a low Mooney viscosity, and the ethylene content of the main EPDM is made lower than that of the EPDM described in the above reference (conventional example: Japanese Patent Application Laid-open SHO 61(1986)-221249), namely, the o-olefin content of the main EPDM is increased as much. Consequently, when compared with the conventional sealing part for a hydraulic cylinder, the sealing part of the present invention exhibits improved resistance to low-temperature permanent compression strain, and improved kneadability (processability) during preparation of the rubber compound, i.e., a material for forming the sealing part of the present invention.

The present invention is further illustrated by the following examples.

EXAMPLES 1-4 AND COMPARATIVE EXAMPLES 1-7

As the main EPDM, copolymers of varying composition, attributes and distributions as indicated in Table 1 were used. The data on $M_w/M_n$ was derived from molecular weight distributions determined by the gel permeation chromatography (using o-dichlorobenzene as solvent). The data on $C_3E - C_3I$, were calculated from molecular weight distributions determined by the fractional precipitation method (number of fractions: not less than 10, solvent: cyclohexane/isopropyl alcohol).

As the sub-EPDM, a copolymer having a Mooney viscosity of ML 8, an ethylene content of 61 wt%, a propylene content of 39 wt%, and an iodine value of 22.

The basic rubber formulation was as follows.

| Polymer component | 100 |
| EPDM (main polymer | varied |
| Low-Mooney EPDM (sub-polymer | varied |
| Furnace black | 40 |
| Zinc oxide | 5 |
| Processing aid (higher fatty acid type) | 3 |
| Co-crosslinking agent | 1 |
| Dicumyl peroxide | 4 |

As the furnace black, a normal type one (iodine adsorption capacity: 53 mg/g, dibutylphthalate adsorption capacity: 58 ml/100 g) was used.

A varying rubber compound of the formulation shown above was kneaded and then compression molded (vulcanizing conditions: 170° C. × 20 minutes), whereby test pieces were prepared. The test pieces were subjected to the following tests.

(1) Normal physical properties [$H_S$ (hardness), $T_B$ (tensile strength), and $E_B$ (elongation)]—By the methods of JIS K6301 (using dumbbel test pieces, No. 3), with necessary modifications.

(2) Tear resistance—By the method of tear test (B type) specified by JIS K6301, with necessary modifications.

(3) Permanent strain by compression—(1) JIS Method: The compression permanent strain test (150° C. × 22 hours) specified in JIS K6301 was carried out with necessary modifications. (2) Standing method: In the compression permanent strain test of JIS K6301, a given test piece was heated at 150° C. for 22 hours, compressed, and then left standing in a compressed state until it cooled to room temperature, after which it was left standing at room temperature for another 5 hours.

(4) Low-temperature permanent stain by compression—The low-temperature permanent strain test ($-30°$ C. × 22 hours) specified in JIS K6301 was carried out with necessary modifications.

(5) Abrasion resistance—With an Acron type tester, a given test piece was abraded 1,000 times under the conditions (number of rotations of friction wheel; 33 rpm, temperature of the ambient air; 23° C.). After the test, the test piece was measured to determined loss of volume.

(6) Processability (1) Kneadability was determined by observing the state of materials after primary kneading (Banbury mixer) of each rubber compound. The rating (mark) shown in the Table 1 is as follows; 0: united in a body, Δ: not united in a body.

(2) With respect to roll retention, the state of retention of rubber during secondary kneading (roll milling) was determined. The rating (mark) shown in the Table 1 is as follows; 0: substantially not peeled, Δ: sometimes peeled.

From Table 1 showing the results of all the tests, the following can be seen.

In all of Examples 1 to 4 of the present invention, the low-temperature permanent strain by compression is small, and the processability is satisfactory.

In Comparative Examples 1 to 7 in which the sub-polymer is not added, the processability is not satisfactory.

In both Comparative Examples 2 and 3 in which the ethylene content of the main EPDM is outside the range specified in the present invention (namely, it exceeds 59 wt%), the low-temperature permanent strain by compression is large.

In Comparative Example 4 in which the ethylene content of the main EPDM is in the specified range of the present invention but the iodine value and $C_3E - C_3I$ are outside the ranges in the present invention, the ordinary-temperature permanent strain by compression is large, and the low-temperature permanent strain by compression is large as much.

In Comparative Examples 1, 5, 6 and 7 in which the sub-EPDM is not added though other constituents are in the ranges specified in the present invention, the low-temperature permanent strain by compression is small.

TABLE 1

| | | Example | | | | Comparative Example | | | | | | |
|---|---|---|---|---|---|---|---|---|---|---|---|---|
| | | 1 | 2 | 3 | 4 | 1 | 2 | 3 | 4 | 5 | 6 | 7 |
| Blending amount of main-polymer | | 60 | 70 | 80 | 90 | 100 | 100 | 100 | 100 | 100 | 100 | 100 |
| Attribute of main polymer | Ethylene context (%) | 55 | the | the | the | the | 63 | 64 | 58 | 57 | 52 | 46 |
| | Propylene content (%) | 45 | same | same | same | same | 37 | 36 | 42 | 43 | 48 | 54 |
| | Iodine value | 30 | as | as | as | as | 29 | 30 | 15 | 30 | 30 | 30 |
| | Viscosity ($ML_{1+4}$ 100° C.) | 45 | left | left | left | left | 45 | 46 | 43 | 46 | 42 | 42 |
| | Mw/Mn | 4.0 | | | | | 3.8 | 3.0 | 9.3 | 3.6 | 3.7 | 3.5 |
| | $C_3E-C_3I$ | 3 | | | | | 3 | 3 | 11 | 3 | 3 | 3 |
| Blending amount of sub-polymer (ML8) | | 40 | 30 | 20 | 10 | — | — | — | — | — | — | — |
| Normal physical properties | $H_S$ (JIS-A) | 70 | 70 | 70 | 71 | 71 | 70 | 69 | 68 | 70 | 70 | 69 |
| | $T_B$ (kg/cm$^2$) | 180 | 185 | 191 | 209 | 204 | 203 | 210 | 189 | 196 | 199 | 187 |
| | $E_B$ (%) | 330 | 330 | 320 | 300 | 290 | 310 | 380 | 370 | 300 | 340 | 320 |
| Tear resistance | Tr (kgf/cm) | 46 | 47 | 48 | 55 | 57 | 56 | 56 | 54 | 54 | 54 | 53 |
| Compression permanent strain (150° C.) | JIS Method $C_S$ (%) | 12 | 11 | 10 | 9 | 9 | — | 9 | 17 | 17 | — | — |
| | Standing method $C_S$ (%) | 24 | 22 | 20 | 19 | 18 | 20 | 18 | 30 | 30 | 20 | 18 |
| Low-temperature compression permanent strain ($-30°$ C.) | $C_S$ (%) | 47 | 45 | 43 | 42 | 42 | 69 | 65 | 67 | 67 | 44 | 45 |
| Abrasion resistance | Amount of wear (cc) | 0.27 | 0.26 | 0.24 | 0.25 | 0.24 | — | 0.20 | 0.28 | 0.28 | — | — |
| Processability | Kneadability | 0 | 0 | 0 | 0 | 0 | Δ | 0 | 0 | 0 | Δ | Δ |
| | Roll retention | 0 | 0 | 0 | 0 | Δ | Δ | Δ | 0-Δ | 0-Δ | Δ | Δ |

Examples 5 and 6

Figure 2:
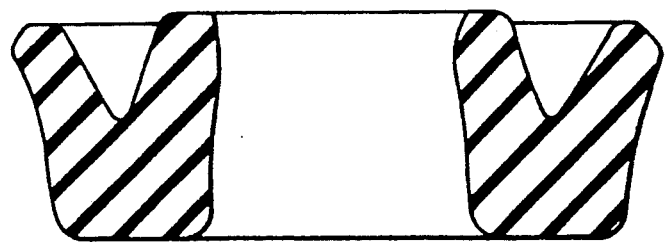
FIG. 2 shows an annular type piston cup for a hydraulic cylinder.

Each of the rubber compounds of the formulations of Examples 1 to 4, respectively, was kneaded and then transfer molded (vulcanizing conditions: 170° C. × 20 minutes) to produce the piston cups shown in FIG. 1 and FIG. 2.

While the present invention has been illustrated by detailed descriptions of preferred embodiments thereof, it will be obvious to those skilled in the art that various changes in form and detail can be made therein without departing from the true scope of the invention. For that reason, the invention must be measured by the claims appended thereto.

What is claimed is:

1. A vulcanizable rubber blend comprising:
   50 to 90 wt parts of an EPDM rubber having a Mooney viscosity of 35 to 55, an ethylene content of 45 to 59 wt, an Δ-olefin content of 41 to 55 wt%, and an iodine value of 20 to 35; '10 to 50 wt parts of an EPDM rubber having a Mooney viscosity of 5 t 25; and
   a vulcanizing agent.

2. A vulcanizate comprising the rubber blend of claim 1.

3. An article of manufacture formed from the vulcanizate of claim 2.

4. An article according to claim 3 which is a mechanical seal or sealing part.

5. A sealing part formed of a peroxide vulcanizate of a rubber mixture comprising 50 to 90 parts by weight of an EPDM having an ethylene content of 45 to 59 wt%, an α-olefin content of 41 to 55 wt%, a Mooney viscosity ($ML_{1-4}$ 100° C.) of 35 to 55, and an iodine value of 20 to 35, and 50 to 10 parts by weight of a low-Mooney EPDM (a sub-polymer) having a Mooney viscosity ($ML_{1+4}$ 100° C.) of 5 to 25.

6. A sealing part according to claim 5 formed of a peroxide vulcanizate of a rubber mixture comprising 50 to 90 parts by weight of an EPDM having a molecular weight distribution of $M_w/M_m \leqq 5.0$, and 50 to 10 parts by weight of a low-Mooney EPDM having a Mooney viscosity ($ML_{1+4}$ 100° C.) of 5 to 25.

7. A sealing part according to claim 5 formed of a peroxide vulcanizate of a rubber mixture comprising of 50 to 90 parts by weight of an EPDM having an α-olefin composition distribution of $C_3E - C_3I \leqq 5.0$ wt%, wherein $C_3I$ stands for a high molecular weight side α-olefin content and $C_3E$ for a low molecular weight side α-olefin content respectively in the polymers of the portions, 20 wt%, each in opposite sides of the molecular weight distribution, and 50 to 10 parts by weight of a low-Mooney EPDM (a sub-polymer) having a Mooney viscosity ($ML_{1+4}$ 100° C.) of 5 to 25.

* * * * *